(12) United States Patent
Fang

(10) Patent No.: US 12,495,519 B2
(45) Date of Patent: Dec. 9, 2025

(54) INTEGRATED WATER COOLING RADIATOR STRUCTURE

(71) Applicant: JIETE TECHNOLOGY CO., LTD, Qingyuan (CN)

(72) Inventor: Anding Fang, Qingyuan (CN)

(73) Assignee: JIETE TECHNOLOGY CO., LTD, Qingyuan (CN)

( * ) Notice: Subject to any disclaimer, the term of this patent is extended or adjusted under 35 U.S.C. 154(b) by 90 days.

(21) Appl. No.: 18/666,302

(22) Filed: May 16, 2024

(65) Prior Publication Data

US 2025/0324542 A1  Oct. 16, 2025

(30) Foreign Application Priority Data

Apr. 12, 2024  (CN) .......................... 202410444490.8

(51) Int. Cl.
*H05K 7/20* (2006.01)
*G06F 1/20* (2006.01)

(52) U.S. Cl.
CPC ........... *H05K 7/20272* (2013.01); *G06F 1/20* (2013.01)

(58) Field of Classification Search
CPC ....... H05K 7/20272; G06F 1/20; F25B 21/02; F25B 39/00; F28D 21/00
USPC ...................................................... 165/80.4
See application file for complete search history.

(56) References Cited

U.S. PATENT DOCUMENTS

| 10,198,046 | B2* | 2/2019 | Tsai | G06F 1/20 |
| 11,732,969 | B2* | 8/2023 | Chen | F28D 1/0233 |
| | | | | 165/71 |
| 11,930,618 | B2* | 3/2024 | Chen | H05K 7/2039 |
| 12,158,307 | B2* | 12/2024 | Xiao | F28D 1/05375 |
| 2016/0338223 | A1* | 11/2016 | Tsai | F28F 13/06 |
| 2020/0236807 | A1* | 7/2020 | Deng | F28F 27/02 |
| 2021/0180890 | A1* | 6/2021 | Cheng | F28D 1/04 |
| 2021/0385969 | A1* | 12/2021 | Geng | G06F 1/20 |
| 2023/0403828 | A1* | 12/2023 | Lin | H05K 7/20272 |
| 2025/0294701 | A1* | 9/2025 | Huang | H01L 23/473 |

FOREIGN PATENT DOCUMENTS

| CN | 113395868 A | * | 9/2021 | ......... H05K 7/20218 |
| CN | 113720046 B | | 11/2021 | |
| CN | 220473949 U | | 2/2024 | |
| TW | I851870 B | * | 8/2024 | ......... H05K 7/20409 |
| TW | I854029 B | * | 9/2024 | ............... G06F 1/20 |
| TW | M662698 U | * | 11/2024 | |

* cited by examiner

*Primary Examiner* — Jon T. Schermerhorn, Jr.
(74) *Attorney, Agent, or Firm* — JEEN IP LAW, LLC

(57) ABSTRACT

The present invention discloses an integrated water cooling radiator structure, including a housing, a water pump, and a water cooling device, the housing includes a front housing and a rear housing that form a hollow cavity, the hollow cavity is provided with a partition and is divided into one or a plurality of independent pump cavities, the pump cavity is provided with an outlet and an inlet, and the water pump is provided with a pump cavity, the front housing is provided with a limit housing in the direction towards the rear housing, and the limit housing is recessed in the hollow cavity, an impeller is provided between the inner wall of the limit housing and the inner wall of the rear housing, and the impeller is provided with a rotor structure extending into the pivot section.

10 Claims, 11 Drawing Sheets

INTEGRATED WATER COOLING RADIATOR STRUCTURE

CROSS-REFERENCE TO RELATED APPLICATIONS

This application claims priority to Chinese Patent Application No. 202410444490.8, filed on Apr. 12, 2024, which is hereby incorporated by reference in its entirety.

TECHNICAL FIELD

The present invention relates to the field of water cooling radiator, in particular to an integrated water cooling radiator structure.

BACKGROUND

The water cooling system of computer refers to a physical circulation system that utilizes the high specific heat capacity of water in a relatively enclosed computer host to dissipate heat from easily heating modules, such as the central processing unit and graphics card.

In order to integrate water pump with heat dissipation device, existing water cooling radiator structures generally design a protruding water pump (resulting in poor symmetry), which allows the housing to accommodate a larger water pump. Of course, there are also smaller volume motors. However, in order to achieve heat dissipation, the water pipe generally has a longer stroke, which may affect the efficiency of heat dissipation.

Chinese patent CN202321827770.4, for example, has obvious protrusions (with symmetry issues) that enable fluid circulation, but also complex waterway design and poor adaptability and adjustability. In actual factory production, molds have to be made one by one as needed to achieve the intended fluid circulation;

Of course, there are also housing structures that horizontally protrude (with symmetry issues), for example, Chinese patent CN202111026370.9 provides integrated water channels for water tank and water pump. However, from a design perspective, it still faces poor aesthetics and inconvenient assembly, that is, each structure cannot be assembled as a separate module.

SUMMARY

The main purpose of the present invention is to propose an integrated water cooling radiator structure to change the existing water cooling radiator structure, thereby modularizing all structures, and according to actual needs, the flow channels can be adjusted, the fluid direction adjustment or assembly change can be made.

To achieve the above objectives, the present invention proposes an integrated water cooling radiator structure, including:

a housing, the housing includes a front housing and a rear housing that form a hollow cavity, the hollow cavity is provided with a partition and is divided into the mutually independent first pump cavity and second pump cavity, The upper wall of the first pump cavity is provided with a first inlet, the rear wall of the first pump cavity is provided with a first outlet, the rear wall of the second pump cavity is provided with a second inlet, and the upper wall of the second pump cavity is provided with a second outlet;

two water pumps, including a first water pump and a second water pump respectively located in the first pump cavity and the second pump cavity, wherein the first water pump and the second water pump have the same structure, the front housing is provided with a limit housing in the direction towards the rear housing, and the limit housing is recessed in the hollow cavity, the inner wall of the limit housing and the inner wall of the front housing form a pivot section, and the outer peripheral wall of the limit housing is provided with a limit section that is coaxially set with the pivot section;

an impeller is provided between the inner wall of the limit housing and the inner wall of the rear housing, and the impeller is provided with a rotor structure extending into the pivot section; the limit section is provided with a magnetic induction coil that fits the rotor structure, and the magnetic induction coil, when energized, can drive the impeller to rotate;

a water cooling device, the water cooling device includes a front baffle and a rear baffle that are set at an interval, a heat dissipation fin set between the front baffle and the rear baffle, and a heat dissipation water pipe, a plurality of heat dissipation fins are set at intervals, and the water pipe is deployed between two heat dissipation fins;

a first diversion channel is enclosed between the front baffle and the rear housing, the rear baffle is provided with a second diversion channel, and the first diversion channel is provided with a water cooling inlet and a water cooling outlet;

the water cooling inlet is connected to the first outlet, and the water cooling outlet is connected to the second inlet, the first diversion channel and second diversion channel are used to connect water pipes and enclose a circulating flow channel, and a water cooling inlet and a water cooling outlet are respectively disposed at both ends of the circulating flow channel.

In this design, the water cooling radiator is divided into two parts, the water pump module and the water cooling device module, firstly, the dual water pump structure can effectively increase the fluid flow rate in the circulation channel, thereby improving the flow stability of the fluid, and in actual control, this design can achieve simultaneous heat dissipation of a plurality of heating elements, and maintain a relatively stable flow rate;

meanwhile, by means of the partition, the hollow cavity makes the first pump cavity and second pump cavity independent, not only facilitates driving the impeller, but also serves as an independent water tank to avoid the problem of flow interruption when the water tank is opened, effectively improving the flow stability of the fluid;

the deployment of limit housing forms a misaligned structure, so that the impeller is embedded in the hollow cavity with better sealing performance, without the need for a penetrating rotating shaft and meanwhile, the deployment of limit section and pivot section enables the coordination between rotor structure and magnetic induction coil, that is, a brushless motor, thereby providing simple structure, fewer assembly processes and better stability.

Of course, slots will be disposed between the specific front housing and rear housing to accommodate sealing rings or achieve mutual independence of the cavities, slots and sealing rings will also be installed between the rear housing and front baffle to seal the first diversion channel; of course, the splitting plate can also be provided with relative insertion structures or elastic pad structures, such as a rubber wrapping structure on the splitting plate; of course, prior art can also be used to achieve relative sealing purpose.

DESCRIPTION OF EMBODIMENTS

The technical solutions in the embodiments of the present invention will be described clearly and completely in conjunction with the accompanying drawings of the embodiments of the present invention. Obviously, the described embodiments are only a part of the embodiments of the present invention, rather than all the embodiments. Based on the embodiments of the present invention, all other embodiments obtained by those of ordinary skill in the art without creative work shall fall within the protection scope of the present invention.

It should be noted that all directional indicators (such as up, down, left, right, front, back, top, bottom, inside, outside, vertical, horizontal, vertical, counterclockwise, clockwise, circumferential, radial, axial . . . ) in the embodiments of the present invention are only used to explain the relative position relationship and movement among various components in a particular posture (as shown in the accompanying drawings), and if that particular posture is changed, the directional indications will change accordingly.

In addition, descriptions involving terms "first," "second" and the like, if any, in the present invention are only for illustrative purposes and cannot be understood as indicating or implying relative importance or the number of features referred to. Therefore, the features defined with "first" and "second" may explicitly or implicitly include at least one or a plurality of the features. At the same time, the technical solutions of various embodiments can be combined with each other, but must be based on what those of ordinary skill in the art can achieve. The combination of technical solutions that result in contradiction or make it impossible to implement should be considered non-existent, and accordingly should not fall within the scope of protection required by this present invention.

Figure 1:
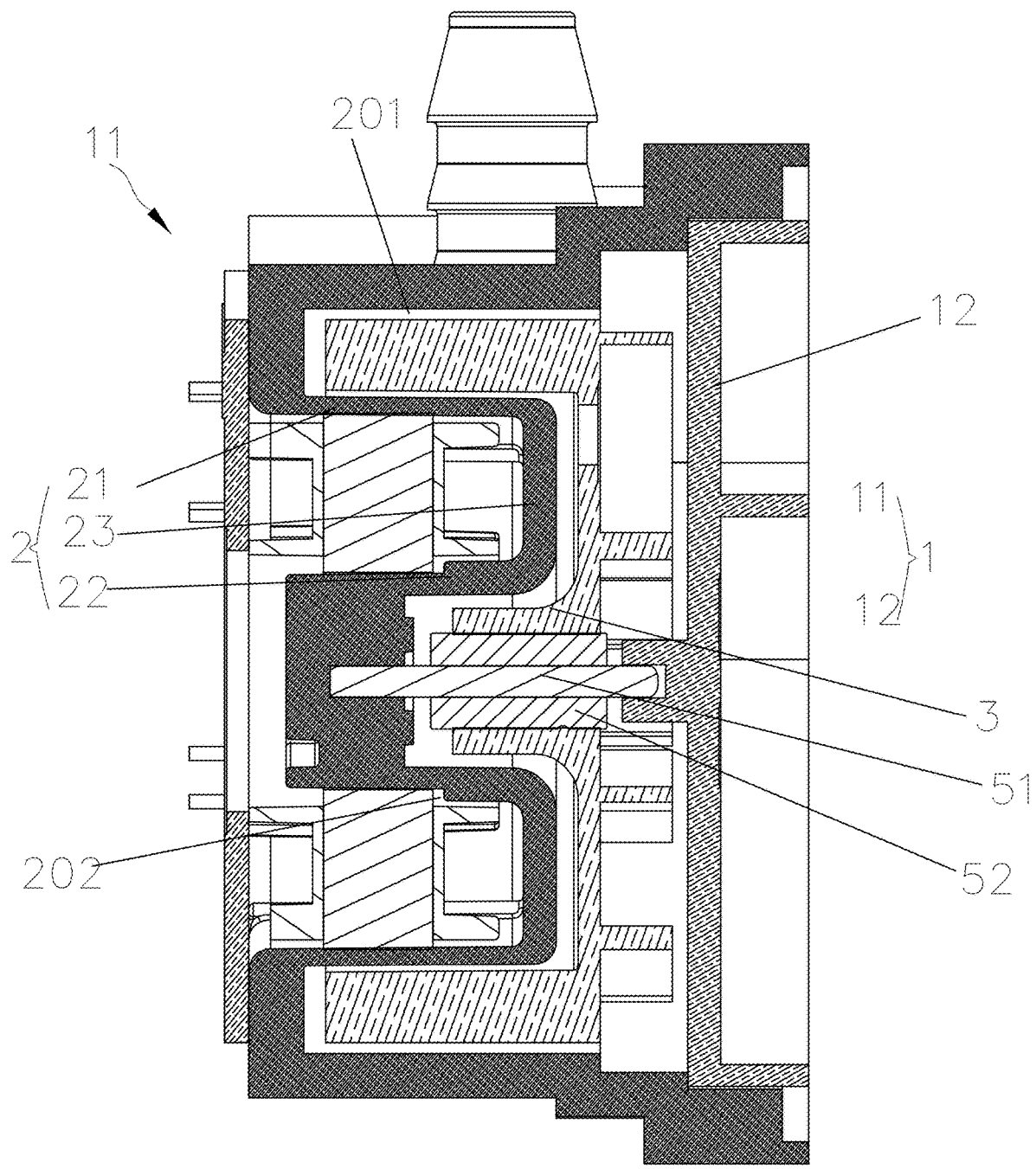
FIG. 1 is a sectional view of the impeller.
Figure 2:
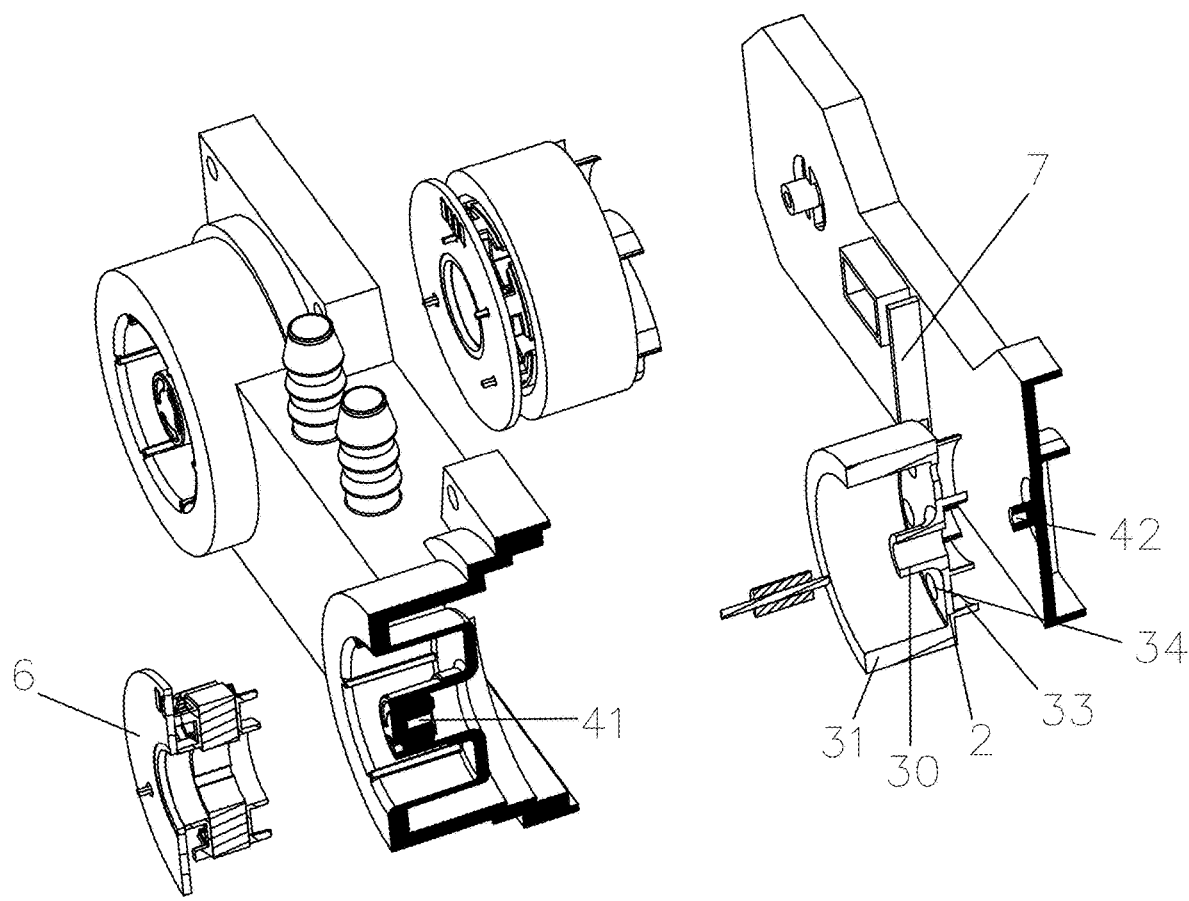
FIG. 2 is a semi sectional schematic diagram of the impeller.
Figure 3:
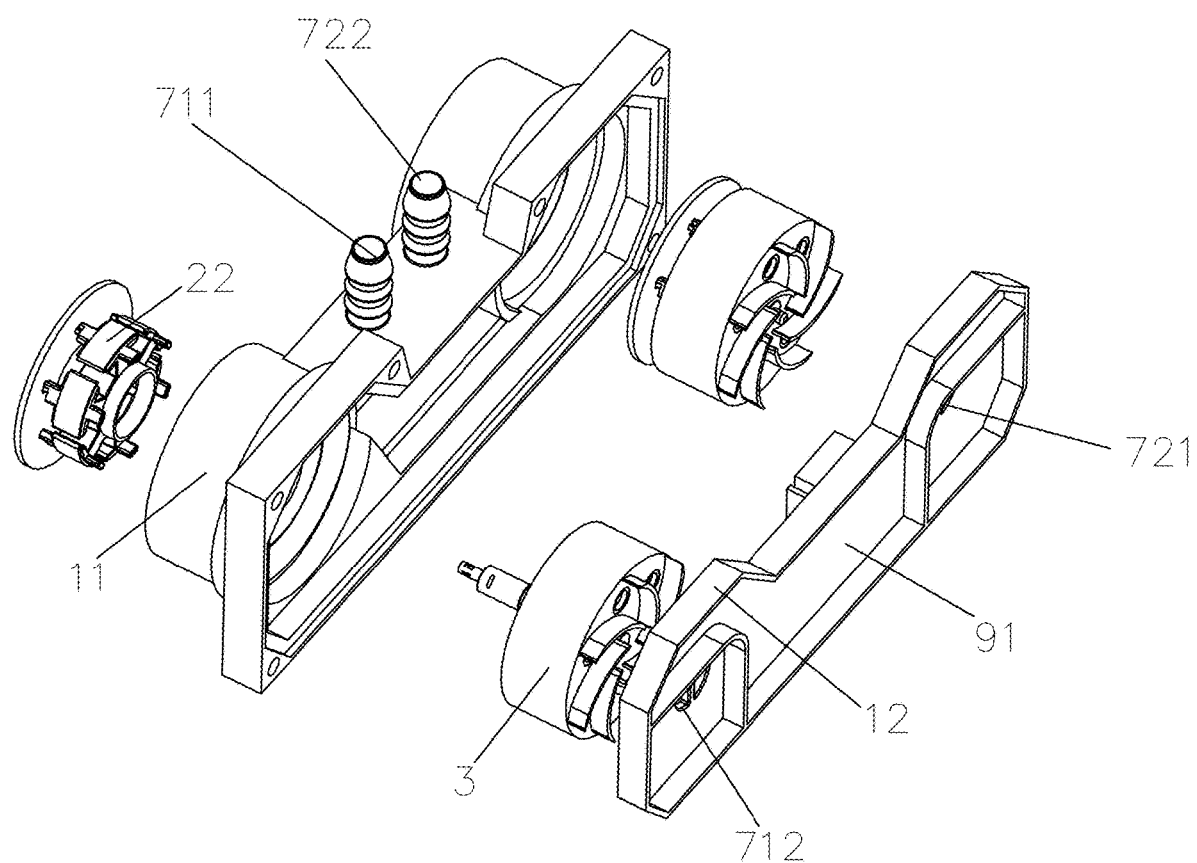
FIG. 3 is an exploded view of the impeller.
Figure 4:
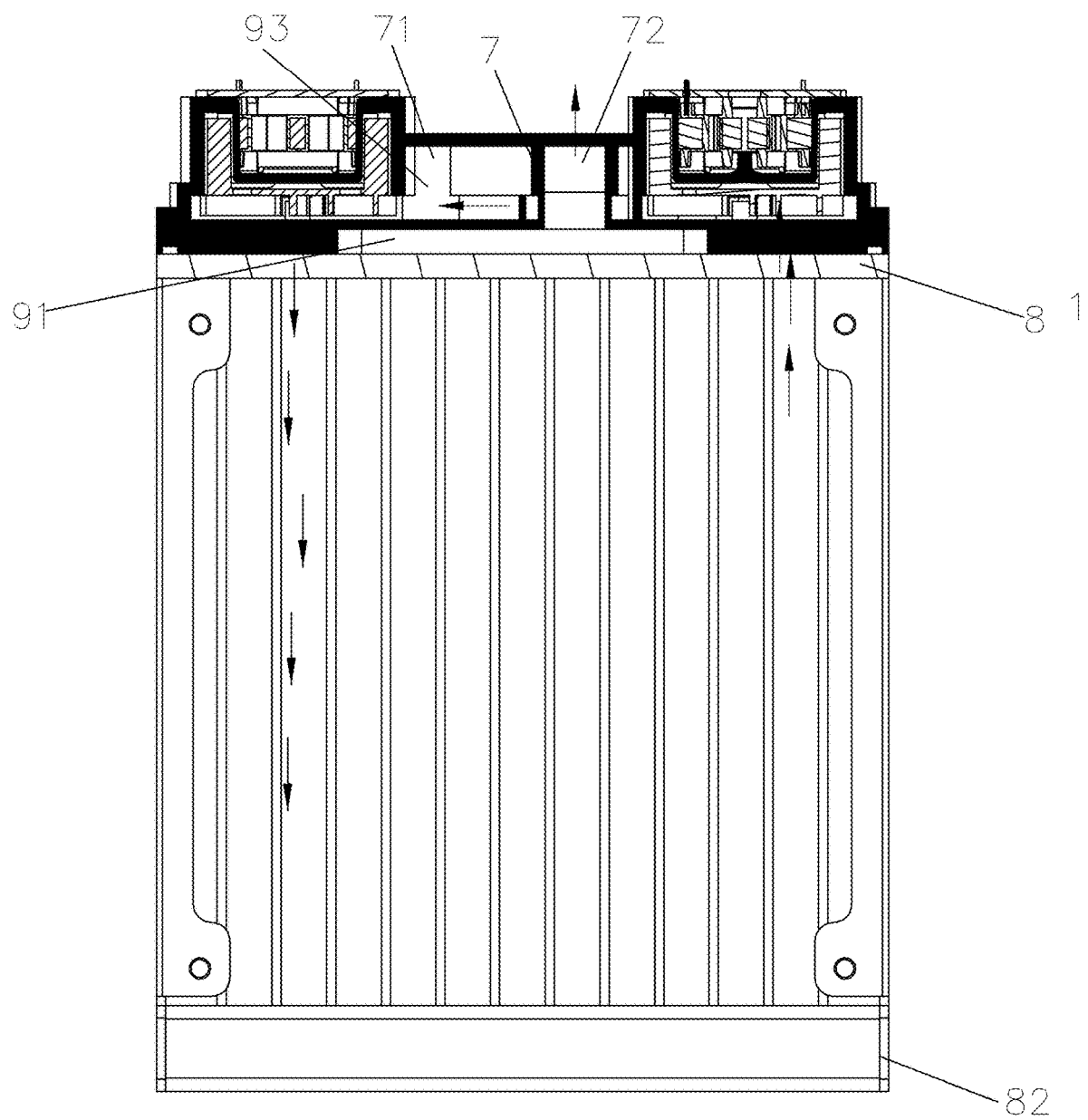
FIG. 4 is a sectional view of the present invention.
Figure 5:
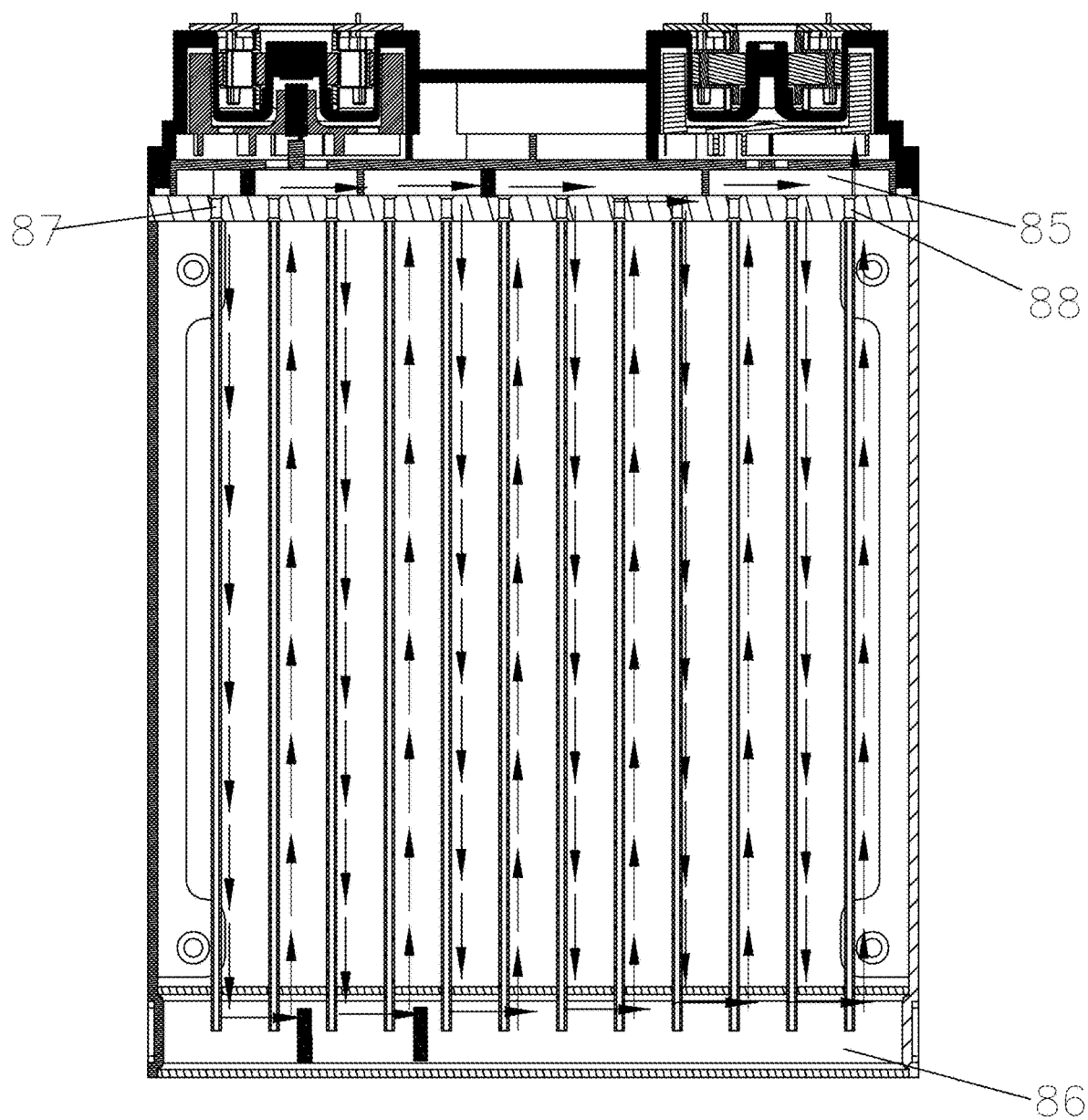
FIG. 5 is a schematic diagram of the first embodiment of the circulating flow channel.
Figure 6:
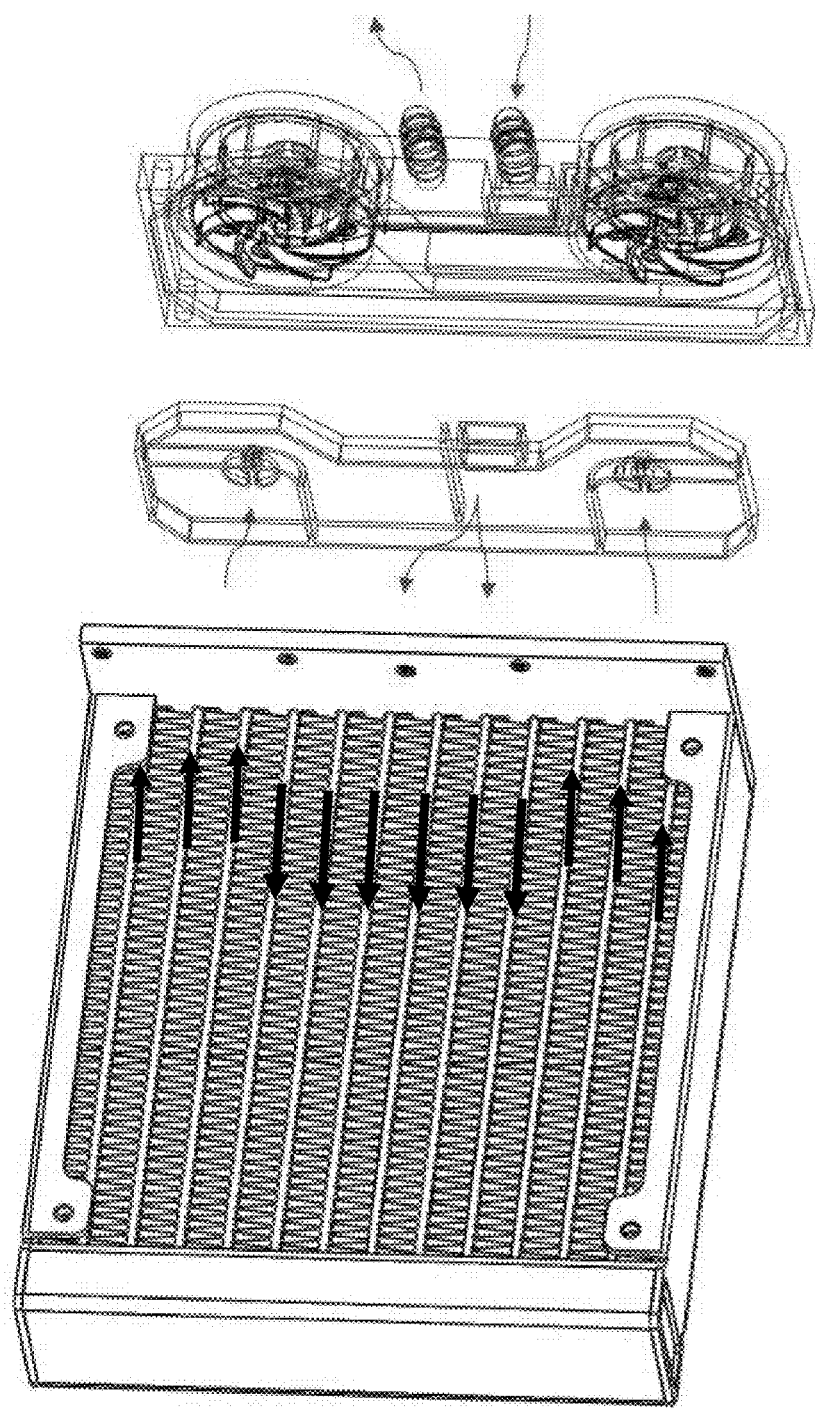
FIG. 6 is a schematic diagram of the second embodiment of the circulating flow channel.
Figure 7:
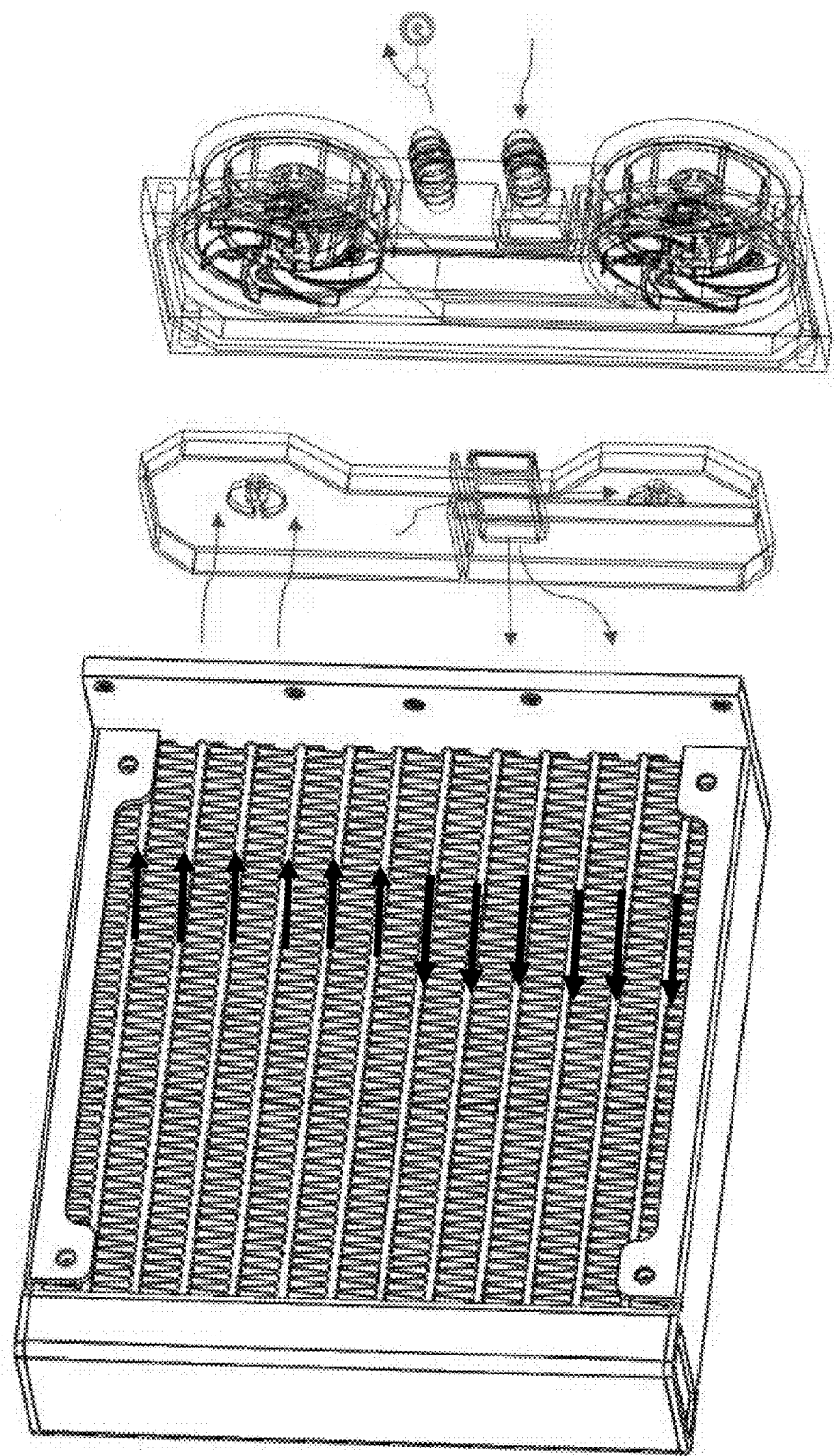
FIG. 7 is a schematic diagram of the third embodiment of the circulating flow channel
Figure 8:
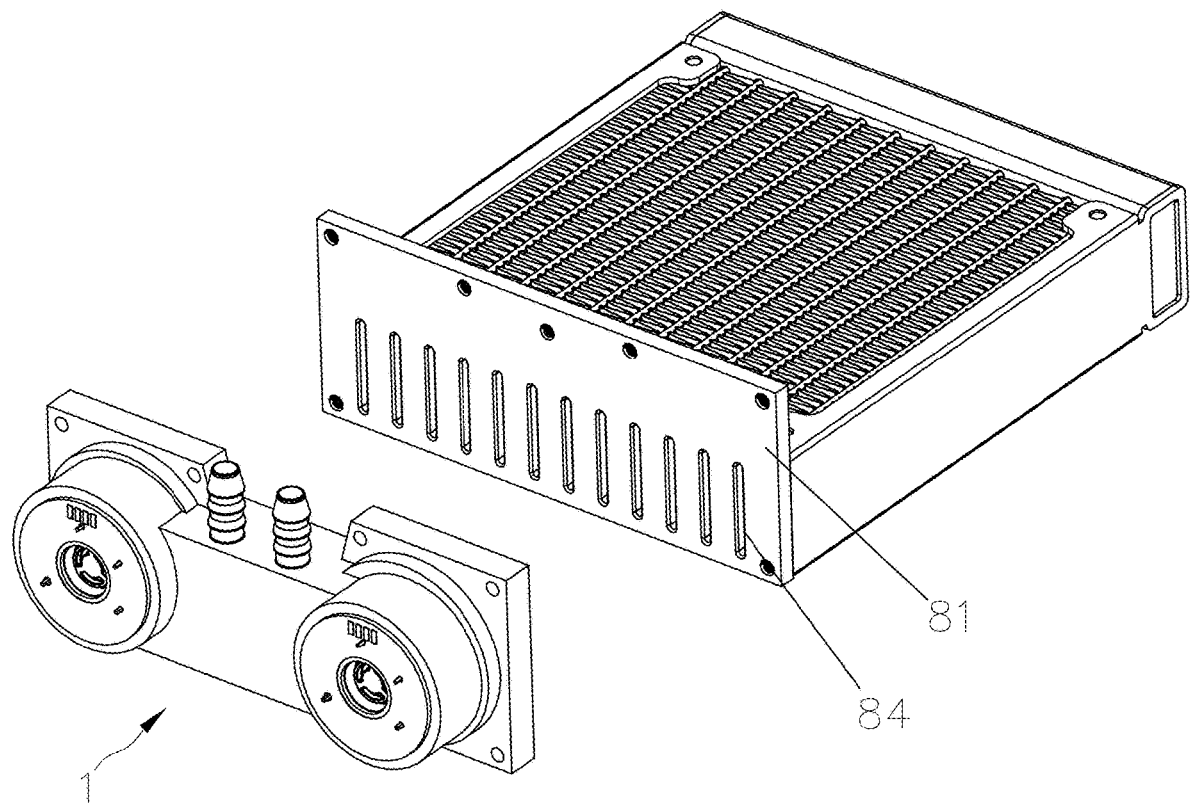
FIG. 8 is a schematic diagram of the coordination between the housing and the water cooling device.
Figure 9:
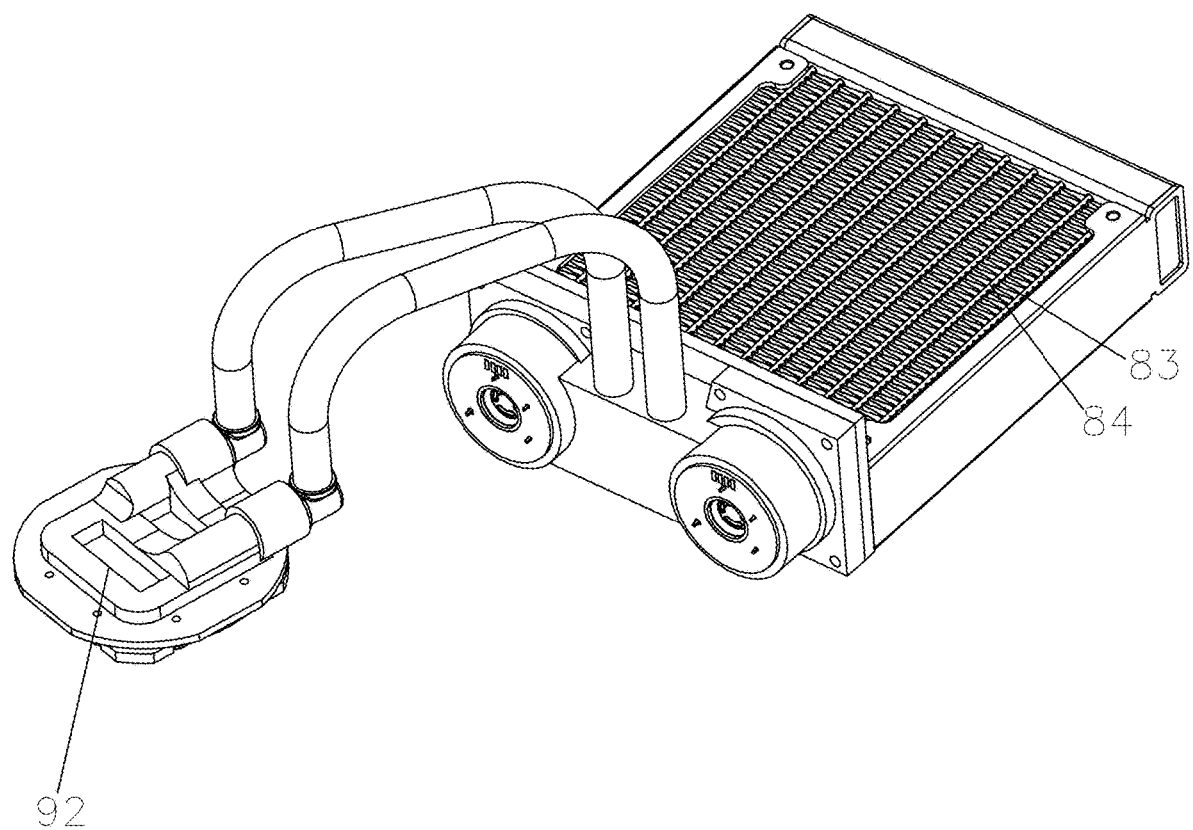
FIG. 9 is a schematic diagram of the coordination between the water cooling device and the water cooling head.
Figure 10:
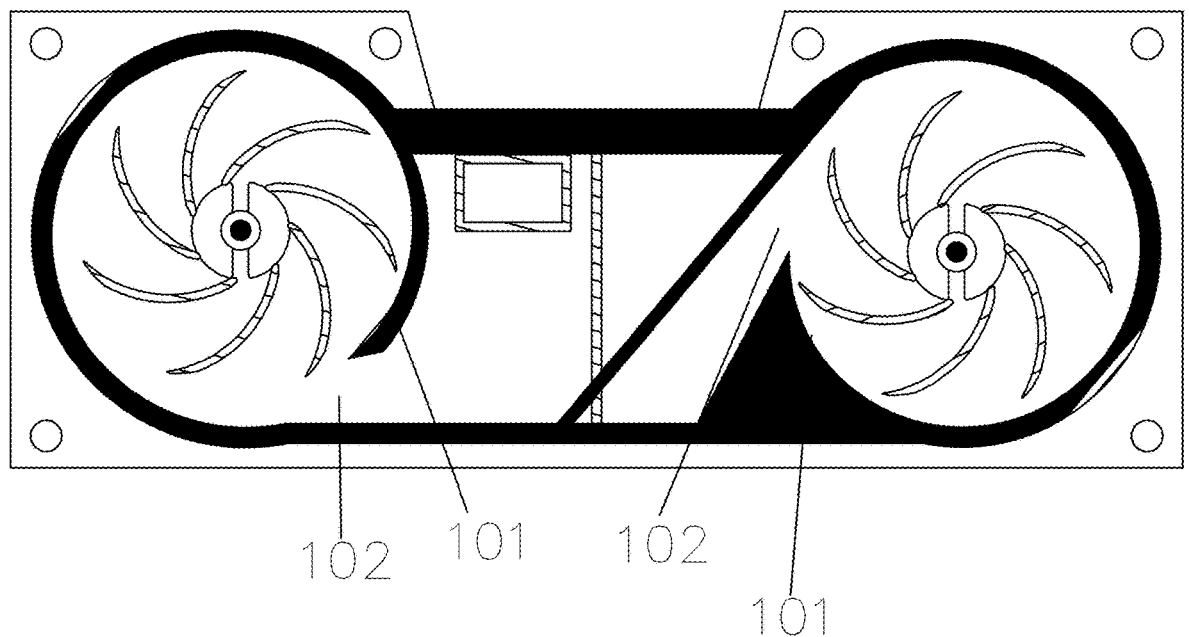
FIG. 10 is a sectional view of the housing.
Figure 11:
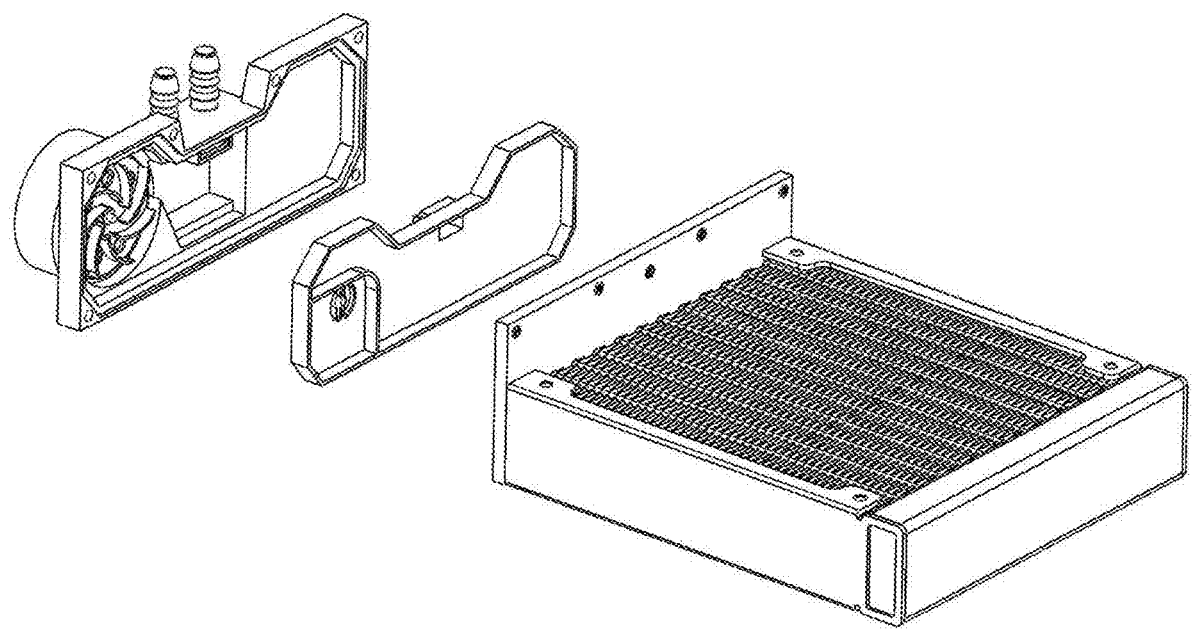
FIG. 11 is a schematic diagram of a single pump structure.
Where, 1: housing, 11: front housing, 12: rear housing, 2: limit housing, 21: the first bending portion, 22: the second bending portion, 23: bottom housing, 201: pivot section, 202: limit section, 3: impeller, 30: shaft, 31: rotor structure, 32: magnetic induction coil, 33: fan blade, 34: through-hole, 41: first pivot groove, 42: second pivot groove, 51: shaft, 52: graphite bearing, 6: PCB board, 7: partition, 71: first pump cavity, 711: first inlet, 712: first outlet, 72: second pump cavity, 721: second inlet, 722: second outlet, 8: water cooling device, 81: front baffle, 82: rear baffle, 83: heat dissipation fin, 84: heat dissipation water pipe, 85: first diversion channel, 86: second diversion channel, 87: water cooling inlet, 88: water cooling outlet, 91: positioning cavity, 92: water cooling head, 93: limit groove, 101: arc-shaped baffle, and 102: notch.

As shown in FIGS. 1 to 11, an integrated water cooling radiator structure, including:

a housing 1, the housing includes a front housing and a rear housing that form a hollow cavity, the hollow cavity is provided with a partition and is divided into the mutually independent first pump cavity and second pump cavity, The upper wall of the first pump cavity is provided with a first inlet, the rear wall of the first pump cavity is provided with a first outlet, the rear wall of the second pump cavity is provided with a second inlet, and the upper wall of the second pump cavity is provided with a second outlet;

two water pumps, including a first water pump and a second water pump respectively located in the first pump cavity and the second pump cavity, wherein the first water pump and the second water pump have the same structure, the front housing is provided with a limit housing in the direction towards the rear housing, and the limit housing is recessed in the hollow cavity, the inner wall of the limit housing and the inner wall of the front housing form a pivot section, and the outer peripheral wall of the limit housing is provided with a limit section that is coaxially set with the pivot section;

an impeller 3 is provided between the inner wall of the limit housing 2 and the inner wall of the rear housing 12, and the impeller 3 is provided with a rotor structure 31 extending into the pivot section 201; the limit section 202 is provided with a magnetic induction coil 32 that fits the rotor structure 31, and the magnetic induction coil 32, when energized, can drive the impeller 3 to rotate;

a water cooling device 8, the water cooling device 8 includes a front baffle 81 and a rear baffle 82 that are set at an interval, a heat dissipation fin 83 set between the front baffle 81 and the rear baffle 82, and a heat dissipation water pipe 84, a plurality of heat dissipation fins 83 are set at intervals, and the water pipe is deployed between two heat dissipation fins 83;

a first diversion channel 85 is enclosed between the front baffle 81 and the rear housing 12, the rear baffle 82 is provided with a second diversion channel 86, and the first diversion channel 85 is provided with a water cooling inlet 87 and a water cooling outlet 88;

the water cooling inlet 87 is connected to the first outlet 712, and the water cooling outlet 88 is connected to the second inlet 721, the first diversion channel 85 and second diversion channel 86 are used to connect water pipes and enclose a circulating flow channel, and a water cooling inlet 97 and a water cooling outlet 88 are respectively disposed at both ends of the circulating flow channel.

In this design, the water cooling radiator is divided into two parts, the water pump module and the water cooling device module, firstly, the dual water pump structure can effectively increase the fluid flow rate in the circulation channel, thereby improving the flow stability of the fluid, and in actual control, this design can achieve simultaneous heat dissipation of a plurality of heating elements, and maintain a relatively stable flow rate;

meanwhile, by means of the partition 7, the hollow cavity 71 makes the first pump cavity 71 and second pump cavity 72 independent, not only facilitates driving the impeller 3, but also serves as an independent water tank to avoid the problem of flow interruption when the water tank is opened, effectively improving the flow stability of the fluid;

the deployment of limit housing 2 forms a misaligned structure, so that the impeller 3 is embedded in the hollow cavity with better sealing performance, without the need for a penetrating rotating shaft 51 and meanwhile, the deployment of limit section 202 and pivot section 201 enables the coordination between rotor structure 31 and magnetic induction coil 32, that is, a brushless motor, thereby providing simple structure, fewer assembly processes and better stability.

Of course, slots will be disposed between the specific front housing 11 and rear housing 12 to accommodate sealing rings or achieve mutual independence of the cavities, slots and sealing rings will also be installed between the rear housing 12 and front baffle 81 to seal the first diversion channel 85; of course, the splitting plate can also be provided with relative insertion structures or elastic pad structures, such as a rubber wrapping structure on the splitting plate; of course, prior art can also be used to achieve relative sealing purpose.

Specifically, the rear wall of the front housing 11 is provided with a concave limit groove 93, and the rear housing 12 is installed inside the limit groove, the rear wall of the rear housing 12 is provided with a positioning cavity 91, the positioning cavity 9 and the front baffle 81 form the first diversion channel 85, and this structure can effectively reduce the thickness of housing 1 and in further, of the water cooling radiator.

In the first embodiment of the present invention, when the current baffle 81 and the rear baffle 82 are respectively provided with splitting plates 200 that are set at interval along the width direction, the circulating flow channel forms a winding and tortuous unidirectional circulating channel.

In the second embodiment of the present invention, when the front baffle 81 and the rear baffle 82 are respectively provided with a splitting plate along the height direction, the circulating flow channel has an inlet pipe composed of a plurality of heat dissipation pipes 84 that are disposed at intervals, and an outlet pipe composed of a plurality of heat dissipation pipes 84 that are disposed at intervals. The winding and tortuous one-way circulation channel with a simple and stable structure and a longer process is preferred, thus effectively achieving heat exchange.

Specifically, the limit housing 2 includes a first bending portion 21 extending from the front housing 11 towards the rear housing 12 and a bottom housing 23 extending from the end of the first bending portion 21, the first bending portion 21 and bottom housing 23 form the limit section 202, and the first bending portion 21 and the front housing 11 form the pivot section 201. The deployment of the first bending portion 21 and bottom housing 23 allows for the coaxial arrangement of rotor structure 31 and magnetic induction coil 32, thereby rotating the impeller 3.

In further, the bottom housing 23 is provided with a second bending portion that extends outward, and the inner wall of the second bending portion forms the first pivot groove 41, the position of the rear housing 12 opposite the first pivot groove 41 is provided with a second pivot groove 42 that fits the first pivot groove 41, the middle of the impeller 3 is provided with a shaft 51, and the two ends of the shaft 51 are pivotally installed in the first pivot groove 41 and the second pivot groove 42. The deployment of dual fulcrums can effectively improve the rotational stability and service life of impeller 3, but the existing impeller has a shorter service life because of the single fulcrum.

Specifically, the shaft 51 is a ceramic shaft 51.

More specifically, a graphite bearing 52 is provided between the shaft 51 and the impeller 3, the graphite bearing 52 is in a elongated structure, thus effectively reducing the friction of impeller 3 during rotation, while the ceramic shaft 51 and graphite bearing 52 are rust resistant.

In the embodiment of the present invention, the impeller 3 is provided with a shaft portion 30 that extends into the first pivot groove 41, thereby providing a larger support area and improving the rotational stability of impeller 3.

In further, the second bending portion is protruded into the limit section 202. In the priority solution, the insertion length of the first pivot groove 41 enclosed by the second bending portion is greater than half of the length of the rotor structure 31, thus ensuring the rotational balance of the impeller 3;

The outer circumference of the impeller 3 is also provided with an arc-shaped baffle, and the arc-shaped baffle is provided with a notch. The deployment of the arc-shaped baffle and notch can effectively increase the fluid pressure when fan blade 33 rotates, thereby improving the stability of flow velocity.

In the embodiment of the present invention, the rear wall or circumferential wall of the impeller 3 is provided with arc-shaped fan blades 33 that are deployed at interval along the outer circumference of the impeller 3 to achieve the intended fluid driving effect, the structure is simple and stable, and the long rotating shaft 51 and double fulcrum structure enables higher rotational speeds, effectively improving fluid driving force.

Specifically, the rotor structure 31 includes a fixed magnet and a plastic layer that encapsulates the fixed magnet as a whole, and the plastic layer and impeller 3 are integrally formed and, of course, in specific embodiments, the fixed magnet can also be installed using an embedded structure, but using an integrally wrapped plastic layer can effectively prevent the rotor structure 31 from coming into contact with the fluid, thereby improving the service life of rotor structure 31.

In the embodiment of the present invention, the fluid inlet or outlet is located on the side wall of the hollow cavity, and the impeller 3 is further provided with an axially penetrating through-hole 34, the through-hole 34 is located between two blades, and the outer wall of the front housing 11 is provided with a PCB board 6, the magnetic induction coil 32 is installed on the PCB board 6, and for the driving by the fluid, a fluid outlet or fluid inlet can be, for example, provided at the position of the rear housing 12, and at the same time, PCB board 6 and magnetic induction coil 32 are integrated and during installation, the PCB board 6 can be directly installed at the position of the first bending portion 21.

A water cooling head 92 is also included, the water cooling head 92 is connected to the first inlet 711 and the second outlet 722 respectively, thereby achieving heat exchange of the fluid.

For the circulating flow channel in the first embodiment, partition boards are deployed at intervals between the first diversion channel and the second diversion channel, so that adjacent water pipes are sequentially connected to form a circulating water channel;

For the circulating flow channel in the first embodiment, partitions are deployed so that a plurality of water pipes located in the middle position serve as an inlet channel, and the water pipes on both sides serve as an outlet channel, thereby forming two outlet channels;

For the circulating flow channel in the third embodiment, partitions are deployed so that a plurality of water pipes on the right side serve as an inlet channel, and plurality of water pipes on the left side serve as an outlet channel, thereby forming a circulating channel;

In the present invention, the directions of inlet and outlet water can also be interchanged, and intended technical effects can also be produced, not limited to the name.

The above are only the preferred embodiments of the present invention, and are not intended to limit the present invention. Any equivalent structural transformation made based on the description and accompanying drawings hereof under the concept of present invention, or be directly/indirectly applied in other related technical fields, should fall within scope of patent protection of the present invention.

What is claimed is:

1. An integrated water cooling radiator structure, including a housing, the housing includes a front housing and a rear housing that form a hollow cavity, the hollow cavity is provided with a partition and is divided into one or a plurality of independent pump cavities, the pump cavity is provided with an outlet and an inlet, a water pump, the water pump is provided with a pump cavity, the front housing is provided with a limit housing in the direction towards the rear housing, and the limit housing is recessed in the hollow cavity, the inner wall of the limit housing and the inner wall of the front housing form a pivot section, and the outer peripheral wall of the limit housing is provided with a limit section that is coaxially set with the pivot section; an impeller is provided between the inner wall of the limit housing and the inner wall of the rear housing, and the impeller is provided with a rotor structure extending into the pivot section; the limit section is provided with a magnetic induction coil that fits the rotor structure, and the magnetic induction coil, when energized, can drive the impeller to rotate; a water cooling device, the water cooling device includes a front baffle and a rear baffle that are set at an interval, a heat dissipation fin set between the front baffle and the rear baffle, and a heat dissipation water pipe, a plurality of heat dissipation fins are set at intervals, and the water pipe is deployed between two heat dissipation fins; a first diversion channel is enclosed between the front baffle and the rear housing, the rear baffle is provided with a second diversion channel, and the first diversion channel is provided with a water cooling inlet and a water cooling outlet; the first diversion channel and second diversion channel are used to connect water pipes and enclose a circulating flow channel, and a water cooling inlet and a water cooling outlet are respectively disposed at both ends of the circulating flow channel.

2. The integrated cooling radiator structure according to claim 1, wherein the rear wall of the front housing is provided with a concave limit groove, the rear housing is installed in the limit groove, the rear wall of the rear housing is provided with a positioning cavity, and the positioning cavity and the front baffle form the first diversion channel; when the front baffle and the rear baffle are respectively provided with splitting plates at intervals along the width direction, and the circulating flow channel forms a winding and tortuous one-way circulating channel.

3. The integrated water cooling radiator structure according to claim 1, wherein the pump cavity includes a first pump cavity and a second pump cavity, the upper or front wall of the first pump cavity is provided with a first inlet, and the rear wall of the first pump cavity is provided with a first outlet, the rear wall of the second pump cavity is provided with a second inlet, and the upper or front wall of the second pump cavity is provided with a second outlet; there are two water pumps, including a first water pump and a second water pump respectively located in the first and second pump cavities, and the first and second water pumps have the same structure; the water cooling inlet is connected to the water cooling outlet, and the water cooling outlet is connected to the water cooling inlet.

4. The integrated water cooling radiator structure according to claim 3, wherein when the front baffle and the rear baffle are respectively provided with a splitting plate along the height direction, the circulating flow channel has an inlet pipe composed of a plurality of heat dissipation pipes that are disposed at intervals, and an outlet pipe composed of a plurality of heat dissipation pipes that are disposed at intervals.

5. The integrated water cooling radiator structure according to claim 3, wherein the limit housing includes a first bending portion extending from the front housing to the back housing and a bottom housing extending from the end of the first bending portion, the first bending portion and the bottom housing forms the limit section, and the first bending portion and the front housing forms the pivot section; the bottom housing is provided with a second bending portion that extends outward, the inner wall of the second bending portion forms a first pivot groove, the position of the rear housing opposite the first pivot groove is provided with a second pivot groove that fits the first pivot groove, the middle of the impeller is provided with a shaft, and both ends of the shaft are pivotally installed in the first pivot groove and the second pivot groove.

6. The integrated water cooling radiator structure according to claim 5, wherein the rotary shaft is a ceramic rotary shaft; a graphite bearing is provided between the shaft and impeller, and the graphite bearing has a long strip structure.

7. The integrated water cooling radiator structure according to claim 5, wherein the impeller is provided with a shaft portion that extends into a first pivot groove; the second bending portion is convex and disposed in the limit section; in the priority solution, the insertion length of the first pivot groove enclosed by the second bending portion is greater than half of the length of the rotor structure; the outer circumference of the impeller is also provided with an arc-shaped baffle, and the arc-shaped baffle is provided with a notch.

8. The integrated water cooling radiator structure according to claim 5, wherein the rear wall or circumferential wall of the impeller is provided with arc-shaped fan blades, and the fan blades are disposed at interval along the outer circumference of the impeller; the rotor structure includes a fixed magnet and a plastic layer that encapsulates the fixed magnet as a whole, and the plastic layer and the impeller are integrally formed.

9. The integrated water cooling radiator structure according to claim 5, wherein the impeller is further provided with an axially penetrating through-hole, the through-hole is arranged between two blades, the outer wall of the front housing is provided with a PCB board, and the magnetic induction coil is installed on the PCB board.

10. The integrated water cooling radiator structure according to claim 1, further including a water cooling head, and the water cooling head is respectively connected to the first inlet and the second outlet.

* * * * *